UNITED STATES PATENT OFFICE

3,136,802
METHOD FOR PREPARING TERTIARY-ALKYL ALKANESULFONATES

William F. Wolff, Park Forest, Ill., and Carl E. Johnson, Griffith, Ind., assignors to Standard Oil Company, Chicago, Ill., a corporation of Indiana
No Drawing. Filed May 11, 1960, Ser. No. 28,217
4 Claims. (Cl. 260—456)

This invention relates to tertiary-alkyl alkanesulfonates and a method for their preparation and recovery.

Heretofore, tertiary-alkyl alkanesulfonates have not been produced by processes which are useful for the preparation of other alkyl alkanesulfones. Perhaps, for this reason it has been thought that tertiary-alkyl alkanesulfonates might not be capable of preparation.

A process has been discovered for the successful preparation of tertiary-alkyl alkanesulfonates and their successful recovery. This process comprises reacting an acyclic tertiary mono-olefinic hydrocarbon, a branched-chain mono-olefinic hydrocarbon having its double bond attached to at least one carbon atom which has no hydrogen atom, with an alkanesulfonic acid or mixtures of alkanesulfonic acids in liquid sulfur dioxide at a temperature to maintain the olefin reactant as a liquid, that is, below —20° C., desirably in the range of —20° to —100° C. and preferably —40° to —80° C. The sulfur dioxide is employed as a reaction solvent and the proportion employed based on either the olefin or alkanesulfonic acid reactants is not critical. For economic reasons the reactants are employed in the range of from about equimolecular proportions to a slight molar excess, 0.05 to 0.1 molar excess, of olefin being preferred. Less than one mole of olefin per mole of alkanesulfonic acid can be employed but then unreacted alkanesulfonic acid will be present. More than the 0.05 to 0.1 mole excess of tertiary olefin can be employed but will only represent a wasteful use of olefin reactant without appreciably enhancing the yield of the desired product.

When the reaction has been completed, the reaction mixture is poured into cold water, at about 0° to 10° C., preferably cold brine (aqueous solution of sodium chloride) at 10 to —20° C. The sulfur dioxide is distilled off, preferably at reduced pressure. The organic phase is separated and recovered from the aqueous phase. Usually a second or third aqueous wash will be useful in preparing a substantially pure product when required. However, when a small amount of sulfonic acid will not impair the use of the tertiary-alkyl alkanesulfonate, no further washing after separation of the first aqueous and organic phases will be necesary.

Although any acyclic tertiary mono-olefinic hydrocarbon, a branched-chain mono-olefinic hydrocarbon having its double bond attached to at least one carbon atom to which no hydrogen is attached, is useful in the process of this invention, the use of tertiary mono-olefinic hydrocarbons having 4 to 8 carbon atoms per molecule will be found to be most practicable. Such tertiary olefins are derived, for example, from the distillation or cracking of petroleum or petroleum products and the destructive hydrogenation of carbonaceous materials. Included among the preferred tertiary mono-olefinic hydrocarbons are isobutylene; 2-methyl-butene-1; 2-methyl-butene-2; 2,3 - dimethyl-butene-1; 2,3 - dimethyl-butene-2; 2,3,3-trimethyl-butene - 1; 2,3,3 - trimethyl-pentene-1; 2,4,4-trimethyl-pentene-1; and 2,3,4-trimethyl-pentene-2.

The alkanesulfonic acid reactants can be illustrated by the formula:

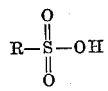

wherein R is a saturated alkyl hydrocarbon group. The size and nature of the saturated alkyl hydrocarbon group is not impotrant since it does not enter into the reaction in the process of this invention. This reactant need not be a single alkanesulfonic acid for mixtures of alkanesulfonic acids can be employed to produce a mixture of esters all having the same tertiary-alkyl group but having, of course, different alkane groups. Of practical significance only, it is preferred to employ alkanesulfonic acid reactants having 1 to 8 carbon atoms in the saturated alkane hydrocarbon group. These can be straight or branched saturated hydrocarbon chains. Examples of such preferred alkanesulfonic acids include the methane-, ethane-, propane-, butane-, pentane-, hexane-, heptane- and octane-sulfonic acids. A typical mixed alkanesulfonic acid is, for example, one having an average number of carbon atoms per molecule of about two and containing primarily methane-, ethane- and propane-sulfonic acids. Similarly mixed alkanesulfonic acids having an average number of carbon atoms per molecule of 3, 4, 5, etc. can be employed. It is desirable to employ the alkanesulfonic acid reactant in a substantially anhydrous form; i.e., containing from 0 to 5 percent by weight water. It is preferred that the alkanesulfonic acid be anhydrous.

The process of this invention is illustrated by the following specific examples.

Example I

In a reaction vessel 80 cc. commercial grade ethane-sulfonic acid is dissolved in 250 cc. liquid sulfur dioxide, and the solution is chilled to —74° C. To this solution is added 125 cc. liquid isobutylene which has been pre-cooled in a Dry Ice-acetone bath. The resulting mixture is then agitated while being cooled in a Dry Ice-acetone bath. Reaction of the isobutylene with the ethanesulfonic acid causes the temperature to rise to —47° C. The temperature then drops back to —75° C. The resulting solution of tertiary-butyl ethanesulfonate in sulfur dioxide has a volume of 385 cc. at this temperature and the total mixture contains less than 10 cc. of polymeric by-products. 190 cc. of the solution are then poured into 250 cc. ice-cold salt water. The resulting mixture is agitated and sulfur dioxide removed by putting the mixture under line vacuum. The aqueous phase is removed and replaced by an additional 250 cc. ice-cold salt water. The mixture is treated as before and then is separated to give the crude tertiary-butyl ethanesulfonate. The product has a volume of 69 cc. at —75° C., is a clear liquid soluble in toluene at room temperature.

In order to determine how much acid has been converted to ester, the acid content of the crude ester is determined by thermal decomposition. A 10½ cc. portion of the crude ester is allowed to warm up to room temperature. After about five minutes the material begins to decompose with the liberation of gas, the formation of butylene polymer, and the separation of ethanesulfonic acid. The decomposition gives 3.6–3.7 grams polymer and 5.7 g. ethanesulfonic acid. From these data it may be calculated that a 70–80% conversion of ethanesulfonic acid to tertiary-butyl ethanesulfonate is obtained. Tertiary-butyl ethanesulfonate has the formula:

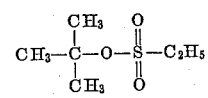

When brine at about 10 to 15° C. is employed in place of ice-cold brine of Example I, the yield of tertiary-butyl ethanesulfonate is about 30%.

Example II

In a reaction vessel 112.5 grams of mixed alkanesulfonic acids are dissolved in 247.5 grams liquid sulfur dioxide and the solution is chilled to −69° C. 64.5 grams of liquid isobutylene are then added to this solution with stirring. The resulting solution is then chilled and 115.5 grams of it are poured into 250 cc. of cold water. The resulting organic phase is thoroughly washed with cold water to give 6.5 grams of clear orange liquid, representing a 14% conversion of acid to t-butyl mixed alkanesulfonates, $N_D^{20}$: 1.424. This liquid is allowed to warm up to room temperature, where it rapidly decomposes to give 3.3 cc. of colorless butylene polymer and 2.6 cc. of mixed alkanesulfonic acids.

When the process of Example II is repeated using the technique of Example I of pouring the reaction mixture into a cold brine instead of water, a yield of the mixture of tertiary-butyl alkanesulfonates substantially equivalent to the ester yield of Example I is obtained.

Tertiary-butyl methanesulfonate can be prepared by reacting isobutylene and methanesulfonic acid according to the process of Example I. Also by following the process of Example I there can be prepared 1,1,2,2,2-pentamethylethyl butanesulfonate by reacting 2,3,3-trimethyl-butene-1 with butanesulfonic acid; 1,1-dimethylpropyl propanesulfonate by reacting 2-methyl-butene-1 with propanesulfonic acid and other tertiary-alkyl alkanesulfonates employing other of the acyclic tertiary mono-olefinic hydrocarbons to react with the alkanesulfonic acids hereinbefore disclosed.

Tertiary-butyl ethanesulfonate is stable at temperatures below 0° C. and remains unchanged for 96 hours at −70° C. At 30° C. tertiary-butyl ethanesulfonate decomposes to $(C_4H_8)_{2-4}$ and ethanesulfonic acid over a period of about 5 minutes. Tertiary-butyl ethanesulfonate is soluble in toluene, styrene, chloroform, tertiary-butyl alcohol and mixtures thereof with benzene and pentane. Tertiary-butyl ethanesulfonate can be used as a latent catalyst making use of its slow decomposoition liberating ethanesulfonic acid. By warming a solution of toluene and tertiary-butyl ethanesulfonate, tertiary butylation of toluene catalyzed by ethanesulfonic acid may be accomplished. By warming a solution of tertiary-butyl ethanesulfonate in styrene to 30° C. polymerization of styrene may be achieved.

What is claimed is:

1. A process for preparing a tertiary-alkyl alkanesulfonate which comprises reacting an acyclic tertiary mono-olefinic hydrocarbon containing 4 to 8 carbon atoms with an alkanesulfonic acid having the formula:

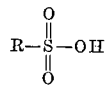

wherein R is an alkyl hydrocarbon group containing 1 to 8 carbon atoms, in liquid sulfur dioxide at a temperature below −20° C.

2. The process of claim 1 wherein the reactants are employed in substantially equimolecular proportions.

3. A process for producing and recovering a tertiary-alkyl alkanesulfonate which comprises reacting an acyclic tertiary mono-olefinic hydrocarbon containing 4 to 8 carbon atoms with an alkanesulfonic acid having the formula:

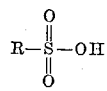

wherein R is an alkyl hydrocarbon group containing 1 to 8 carbon atoms, in the presence of liquid sulfur dioxide at a temperature below −20° C., combining the resulting reaction mixture with a cold aqueous medium selected from the group consisting of water and a sodium chloride brine, removing the sulfur dioxide from the aqueous mixture, and recovering the organic phase from the $SO_2$ free mixture.

4. The process of claim 3 wherein isobutylene is the tertiary olefinic hydrocarbon reactant, ethanesulfonic acid is the alkanesulfonic acid reactant and tertiary-butyl ethanesulfonate is recovered.

References Cited in the file of this patent

UNITED STATES PATENTS

| | | |
|---|---|---|
| 1,929,870 | Isham | Oct. 10, 1933 |
| 2,576,535 | Proell | Nov. 27, 1951 |

OTHER REFERENCES

Williams et al.: J. Am. Chem. Soc., vol. 76, pages 2987–8 (1954).

Brewster: "Organic Chemistry," Prentice-Hall, Inc., New York (1954), Second Edition, page 300 (1 page).